United States Patent
Kwan et al.

(10) Patent No.: US 8,532,117 B2
(45) Date of Patent: Sep. 10, 2013

(54) FLEXIBLE BUFFER ALLOCATION ENTITIES FOR TRAFFIC AGGREGATE CONTAINMENT

(75) Inventors: Bruce Kwan, Sunnyvale, CA (US); Puneet Agarwal, Cupertino, CA (US); Lakshmikantha Ashvin, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 129 days.

(21) Appl. No.: 12/371,394

(22) Filed: Feb. 13, 2009

(65) Prior Publication Data

US 2009/0207848 A1    Aug. 20, 2009

Related U.S. Application Data

(60) Provisional application No. 61/028,360, filed on Feb. 13, 2008.

(51) Int. Cl.
*H04L 12/28* (2006.01)
*H04L 12/56* (2011.01)

(52) U.S. Cl.
USPC .......................... 370/400; 370/413

(58) Field of Classification Search
None
See application file for complete search history.

(56) References Cited

U.S. PATENT DOCUMENTS

| | | | |
|---|---|---|---|
| 6,587,469 B1 * | 7/2003 | Bragg | 370/401 |
| 6,687,220 B1 * | 2/2004 | Ayres | 370/229 |
| 7,403,976 B2 * | 7/2008 | Brown | 709/213 |
| 7,733,894 B1 * | 6/2010 | Giacobbe et al. | 370/415 |
| 2003/0189930 A1 * | 10/2003 | Terrell et al. | 370/389 |
| 2008/0151906 A1 * | 6/2008 | Kolli et al. | 370/395.31 |

* cited by examiner

*Primary Examiner* — Chirag Shah
*Assistant Examiner* — Srinivasa Reddivalam
(74) *Attorney, Agent, or Firm* — McDermott Will & Emery LLP

(57) ABSTRACT

An apparatus comprising a plurality of physical ingress ports configured to receive data, each data having a data type; a plurality of physical egress ports configured to transmit data; a memory configured to buffer data that has been received; a plurality of virtual routing devices, wherein each of the virtual routing devices is associated with a particular data type and each of the virtual routing devices is configured to: virtually buffer data associated with the respective data type, and regulate the quality of service provided to the respective data type; and a data manager configured to manage the receipt and transmission of data.

20 Claims, 4 Drawing Sheets

100

200

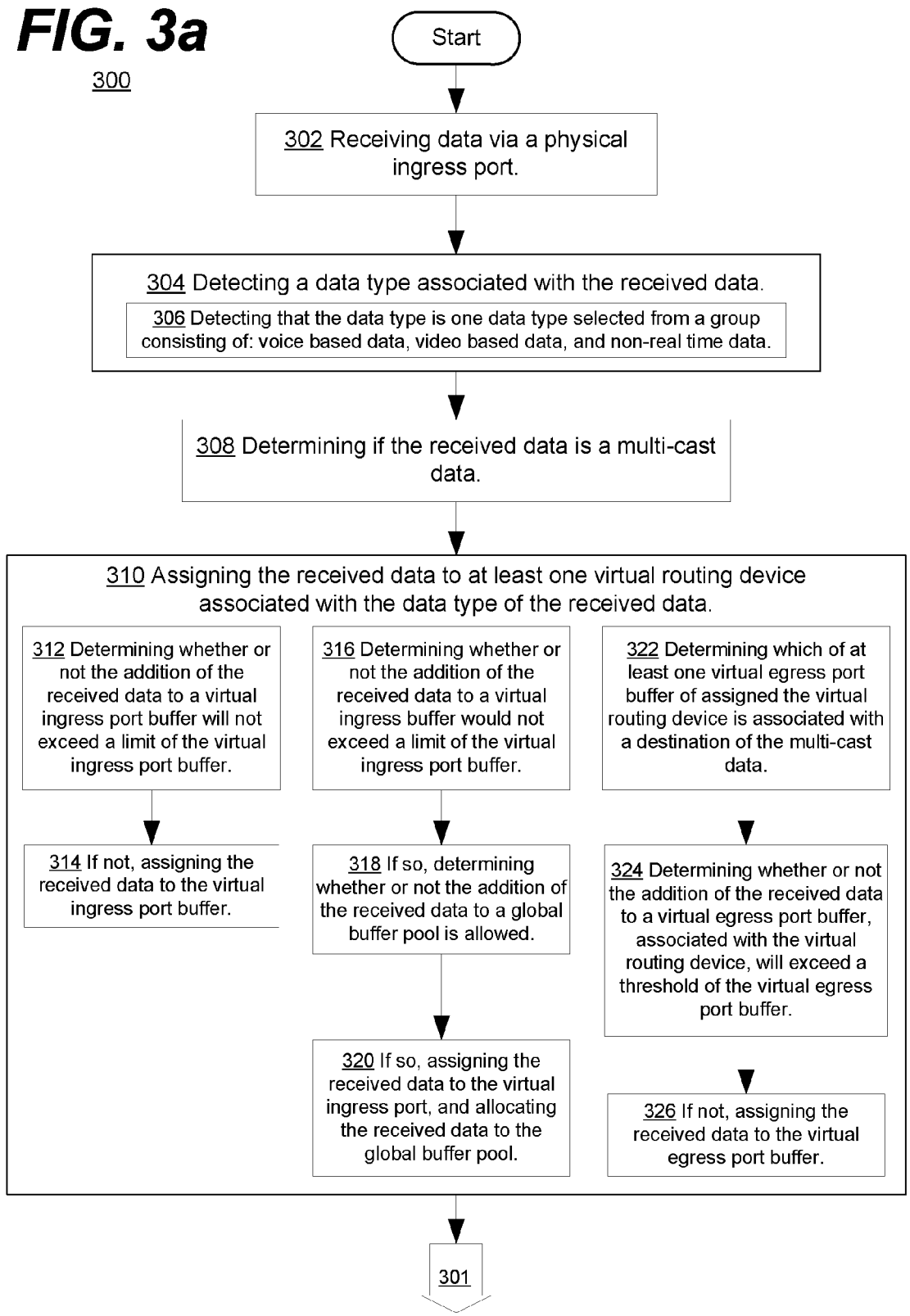

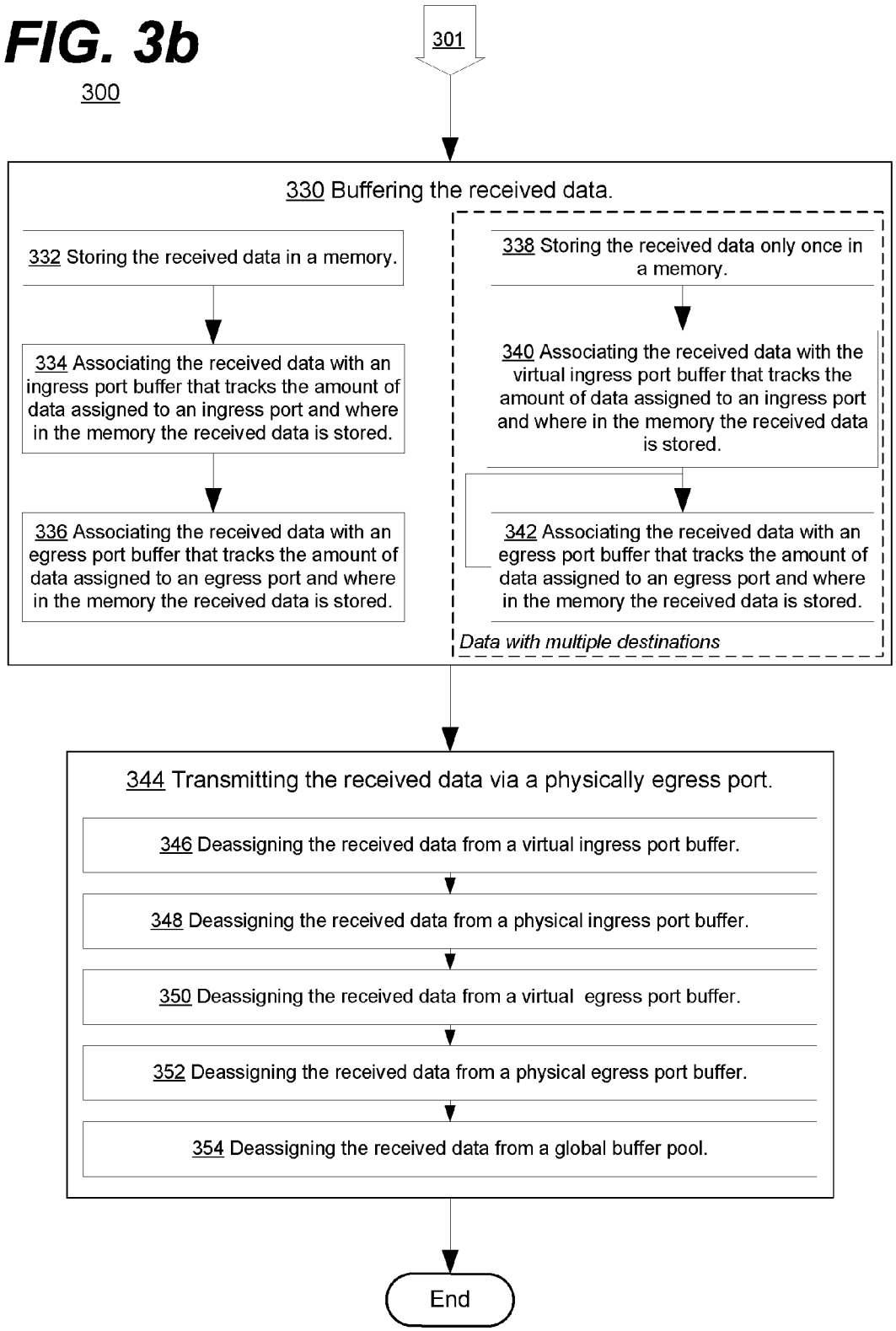

FLEXIBLE BUFFER ALLOCATION ENTITIES FOR TRAFFIC AGGREGATE CONTAINMENT

CROSS-REFERENCE TO RELATED APPLICATION

This application claims priority under 35 U.S.C. §119 to U.S. Provisional Patent Application 61/028,360, filed Feb. 13, 2008, titled "FLEXIBLE BUFFER ALLOCATION ENTITIES FOR TRAFFIC AGGREGATE CONTAINMENT," which is incorporated herein by reference in its entirety.

TECHNICAL FIELD

This description relates to routing data within a communication system and more specifically to using virtual routing devices to regulate the routing of data within an aggregated communication system.

BACKGROUND

Historically, data flowing within a networked communication system has included only one type of data. In most computer networks, this data is often non-real time data (e.g., Internet access, file transfers, web browsing, etc.). Alternately, in telecommunications systems the data is often voice data or data that mimics or pretends to be voice data (e.g., faxes, modems, etc.). In a third example, in cable systems the data is often video (e.g., television, etc.) data.

However, as an increasing number of communication systems converge, communication systems have begun to carry a plurality of types of data. A frequently marketed system includes non-real time data, voice data, and video data (e.g., data for Internet service, data for telephone service, and data for subscription television service, etc.). Such a system may be referred to colloquially as a "triple play" system. However, other systems involving more than one type of data may be referred to as "multi-play". Today, triple play services are often offered by cable television operators as well as by telecommunication operators.

In this context, a definition of a "router" may be a device that extracts the destination of a data it receives, selects a path to that destination, and forwards the data to the next device along this path. In some more specific contexts, a "router" may be a computer networking device that interconnects separate logical subnets. In this context, a network router (or just "router") may include a device that channels incoming data flow from any of multiple input ports to the output port appropriate for the data flow's destination. It is understood that in this context a "router" may include a network bridge or network switch. Typically network routers play an important or integral role in many networks. Typically, network router may be capable of inspecting data as it is received, determining the source and destination device of that data, and forwarding it appropriately. Frequently, by delivering each piece of data only to the device(s) it was intended for, a network router may conserve network bandwidth and offer generally improved performance compared to a network hub (or just "hub"). In some contexts, the terms "switch" and "router" may be user interchangeably.

SUMMARY

A system and/or method for communicating information, substantially as shown in and/or described in connection with at least one of the figures, as set forth more completely in the claims.

BRIEF DESCRIPTION OF THE DRAWINGS

FIG. 3 is a flowchart of an example embodiment of a technique for the routing data within a communication system in accordance with the disclosed subject matter.

DETAILED DESCRIPTION

Figure 1:
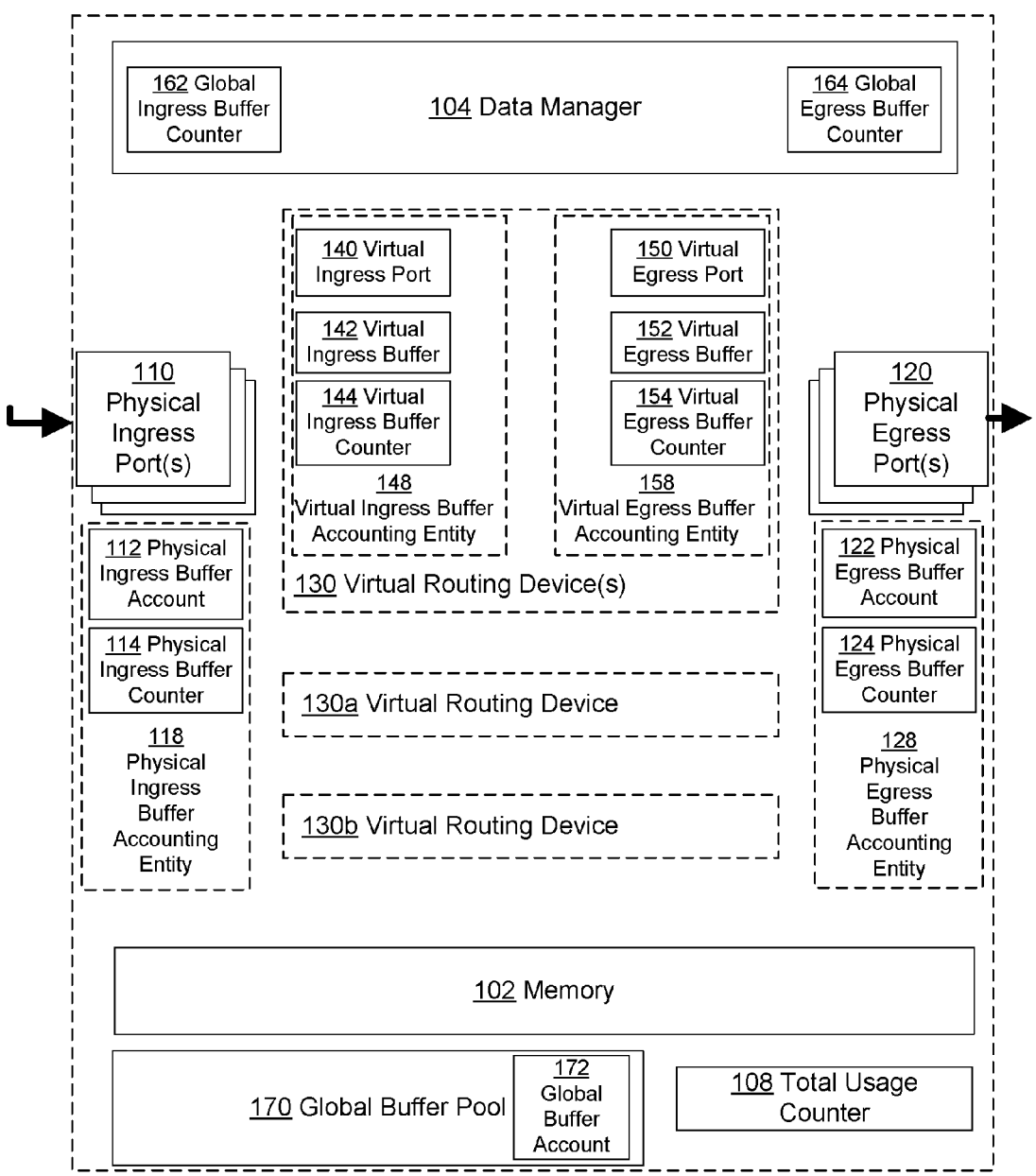
FIG. 1 is a block diagram of an example embodiment of an apparatus for the routing data within a communication system in accordance with the disclosed subject matter.

FIG. 1 is a block diagram of an example embodiment of an apparatus for the routing of data within a communication system in accordance with the disclosed subject matter. In one embodiment, the apparatus or router 100 may include a plurality of physical ingress ports 110, a plurality of physical egress ports 120, a plurality of virtual routing devices 130, a memory 102, and a data manager 104. In a preferred embodiment, the apparatus 100 may be implemented as a network switch; although, it is understood that the above is merely one illustrative example to which the disclosed subject matter is not limited.

In one embodiment, the plurality of physical ingress ports 110 may be configured to receive data. The data may then be inspected to determine to which data type the data conforms. In one embodiment, the data may include a data type selected from a group including the following: video data (e.g., television data), voice data (e.g., telephone data), or non-real time data (e.g., file transfers, web browsing, etc.). In one embodiment, the physical egress port(s) 120 may be configured to transmit data from the apparatus to another device.

In one embodiment, each of the virtual routing devices (e.g., virtual routing devices 103, 103a, and 103b) may be associated with a particular data type. In one embodiment, each virtual routing device 130 may be configured to virtually buffer data associated with the respective data type. In one embodiment, the data may not be actually stored in a buffer of the virtual routing device 130. The data may, in fact, be stored within the memory 102. However, the virtual routing device 130 may include accounting mechanisms to track data as if it was stored within a buffer of the virtual routing device 130. In one embodiment, the virtual routing device may be configured to regulate the quality of service provided to the respective data type, discussed more below.

In one embodiment, the memory 102 may be configured to store or buffer data that has been received. In one embodiment, the memory 102 may be a random access memory (RAM). In such an embodiment, data may be stored in any order or place within the memory 102 and other accounting or data management entities may be responsible for providing a logical order for the data, discussed further below. In one embodiment, this may allow the data to only be stored once despite the data having multiple destinations (e.g., multi-cast data), which may more traditionally have required storage in multiple buffers. In some embodiments, the data may be logically ordered into structures such as, for example: first-in-first-outs (FIFOs), queues, or stacks. In one embodiment, the data manager 104 may be configured to manage the receipt and transmission of data.

In this context the term "buffer" used as a noun can be used to refer to a temporary storage area for data being transmitted between two (or more) devices which, in some embodiments, may function at different speeds. In this context the term "buffer" used as a verb simply can refer to the act of storing data in a temporary storage area.

In various embodiments, the memory 102 may be physically or logically divided into a plurality of buffers. However, it is understood that these buffers need neither to be continuous nor contiguous, and may in fact overlap. For example, in such an embodiment, a single memory space may include data that is simultaneously allocated to a physical ingress buffer, a virtual ingress buffer, a physical egress buffer, and a virtual egress buffer. In various embodiments, this may allow the apparatus 100 the simultaneous benefits of having separate buffers for each port and of having a shared common memory space; although this is merely one example embodiment to which the disclosed subject matter is not limited. The association of the memory space with these buffers and the accounting thereof, may be accomplished by various buffer accounts or buffer accounting entities, as discussed in more detail below. In short, in some embodiments, these buffer accounts may be data structures that provide the logical order to the memory 102 (or a portion thereof) such as, for example: a FIFO, a queue, a stack, etc.

In one example embodiment, data may be received by the apparatus 100 via the physical ingress port 110. Upon receipt of the data, the data manager 104 may be configured to assign the data to a virtual routing device (VRD) 130, based at least in part upon the data type of the received data. In various embodiments, the apparatus 100 may include a virtual routing device 130 for each expected data type. For example, in one embodiment, the apparatus 100 may include a video data virtual routing device (e.g., VRD 130), a voice data virtual routing device (e.g., VRD 130a), and a non-real time data virtual routing device (e.g., VRD 130b), although this is merely one example embodiment to which the disclosed subject matter is not limited. In one embodiment, as data is received it is inspected to determine its data type. For example, if the data type is video data, the data may be assigned to the video data virtual routing device. As discussed in detail below, each virtual routing device may have different characteristics (e.g., buffer sizes or thresholds, speed of operation, etc.). As such the virtual routing devices 130 may be configured to regulate the quality of service provided to the respective data type.

In one specific example embodiment, the apparatus 100 may include three virtual routing devices 130, 130a, and 130b configured for video data, voice data, and non-real-time data, respectively. In this embodiment, each of the plurality of physical ingress ports 110 may have a buffer or a portion of memory 102 assigned to it that is capable of acting as a buffer and storing a predetermined about of data (e.g., about 1,000 kilobytes (kB) of data). The virtual routing devices 130, 130a, and 130b may differ in the amount of buffer storage allocated to them. The video virtual routing device 130 may be allocated a certain portion (e.g., about 600 kB) of the ingress port 140's physical buffer space. The voice virtual routing device 130a may be allocated a certain portion (e.g., about 300 kB) of the physical buffer space, thus leaving the non-real-time virtual routing device 130b with a remaining portion (e.g., about 100 kB) of the physical buffer space. In such an embodiment, the video VRD 130 may be able to burst, for example, six times the amount of data as the non-real-time VRD 130b and twice as much data as the voice VRD 130a. However, it is understood that in a real world context, determining the amount of data that may be actually transmitted, as opposed to burst, may be complicated and involve a number of factors in addition to buffer size and that the above is merely one non-limiting illustrative example. In such a way, in one embodiment, the quality of service for the video, voice, and non-real-time data may be controlled or regulated. Although, it is understood that the above are merely a few illustrative examples to which the disclosed subject matter is not limited.

In one embodiment similar to the specific example embodiment above, the quality of service provided to a specific data type may be controlled or regulated by changing the allocation of physical buffer space to virtual buffer space of the virtual routing devices 130. In various embodiments, the allocation of buffer space may be dynamically configurable. In other embodiments, the allocation may be predetermined or changeable only during power up or via a substantially resetting action. In one embodiment, alluded to in the specific embodiment above, each of the physical ingress ports 110 may allocate their buffers to the virtual routing devices in an identical way, although it is understood that this is merely one allocation scheme and the disclosed subject matter is not so limited. It is also understood that the allocation of physical buffers (both ingress and egress) to the virtual routing devices 130 is merely one technique for regulating the quality of serve provided to a specific data type and that the disclosed subject matter is not limited to this particular technique.

In one embodiment, the data manager 104 may be configured to perform an admission check of the received data to determine whether or not to allow the data to enter and be processed by the system. In various embodiments, the admission check may comprise three elements or phases: a global admission check, an ingress-centric admission check, and an egress-centric admission check. In one embodiment, the data manager 104 may be configured to inspect the received data to determine the data's destination, determine which physical egress port 120 is associated with the destination of the data, and assign the data to the proper physical egress port 120. It is understood that in some instances that data may include multiple destinations (e.g., multi-cast data), in which case that data may be assigned to a plurality of physical egress ports.

In one embodiment, the data manager 104 may be configured to, as part of the global admission check, check, verify, or determine whether or not the admission of the data would exceed a global ingress buffer limit or threshold. In one embodiment, the data manager may include a global ingress buffer counter 162 that is configured to track the amount of memory 102 used by the plurality of physical ingress ports 110 to buffer incoming data. In one embodiment, a threshold or limit may be associated with these collective buffers. In various embodiments, the threshold may be dynamically configurable. In one embodiment, if the data manager 104 determines that all available memory space is being used, the incoming or received data may be ignored, or more colloquially "dropped."

Furthermore, in one embodiment, the data manager 104 may be configured to, as part of the global admission check, check, verify, or determine whether or not the admission of the data would exceed a global egress buffer limit or threshold. In one embodiment, the data manager may include a global egress buffer counter 164 that is configured to track the amount of memory 102 used by the plurality of physical egress ports 120 to buffer incoming data. In one embodiment, a threshold or limit may be associated with these collective buffers. In various embodiments, the threshold may be dynamically configurable. In one embodiment, if the data manager 104 determines that all available memory space is being used, the incoming or received data may be ignored, or more colloquially "dropped." In such an embodiment, the data manager 104 may be configured to verify that the memory 102 includes sufficient available space to store the received data.

In one embodiment, the data manger 104 may be configured to, as part of the ingress-centric admission check, check, verify, or determine whether or not the admission of the data would exceed a buffer limit or threshold for the physical ingress port 110 at which the data arrived. In various embodiments, the threshold may be dynamically configurable. In one embodiment, the physical ingress port 110 may include a physical ingress port buffer accounting entity 118. In various embodiments, the buffer accounting entity 118 may include a physical ingress buffer account 112 and a physical ingress buffer counter 114. As mentioned above, the physical ingress buffer account 112 may track or map to data, related to the physical ingress port 110 and stored within the memory 102, such that the data is arranged in some logical fashion (e.g., a FIFO, a queue, etc.). In various embodiments, this may allow the apparatus 100 the simultaneous benefits of having separate buffers for each port and of having a shared common memory space. In one embodiment, the physical ingress buffer account 112 may include a table of pointers or locations in memory 102 at which data is stored. In one embodiment, the physical ingress buffer counter 114 may be configured to track the amount of data stored in the memory 102 that are associated with the physical ingress port 110. In one embodiment, the physical ingress buffer account 112 and the physical ingress buffer counter 114 may be integrated. In one embodiment, if the data manager 104 determines that all available memory space is being used, the incoming or received data may be ignored, or more colloquially "dropped."

In one embodiment, the data manger 104 may be configured to, as part of the ingress-centric admission check, check, verify, or determine whether or not the admission of the data would exceed a buffer limit or threshold for the virtual ingress port 140 of the virtual routing device 130 to which the data is assigned. In various embodiments, the threshold may be dynamically configurable. In one embodiment, each virtual routing device 130 may include a plurality of virtual ingress ports. In various embodiments, these virtual ingress ports may have a one-to-one correspondence with the physical ingress ports 110. In such an embodiment, if the apparatus includes three virtual routing devices (e.g., VRD 130, 130a, and 130b) each physical ingress port 110 may have three virtual counterparts, one for each virtual routing device. In other embodiments, some physical ingress ports may be restricted to a limited number of data types, and therefore, such a physical ingress port may not have counterparts in every virtual routing device.

In one embodiment, the virtual ingress port 140 may include a virtual ingress port buffer accounting entity 148. Conversely, in one embodiment, the virtual ingress port buffer accounting entity 148 may act as a virtual ingress port 140. In various embodiments, the virtual buffer accounting entity 148 may include a virtual ingress buffer account 142 and a virtual ingress buffer counter 144. As mentioned above, the virtual ingress buffer account 142 may track or map to data, related to the virtual ingress port 140 and stored within the memory 102, such that the data is arranged in some logical fashion (e.g., a FIFO, a queue, etc.). In one embodiment, the virtual ingress buffer account 142 may include a table of pointers or locations in memory 102 at which data is stored. In various embodiments, the virtual ingress buffer account 142 or, more generally, the virtual buffer accounting entity 148 may be thought of as a virtual ingress port buffer. In one embodiment, the virtual ingress buffer counter 144 may be configured to track an amount of data stored in the memory 102 that is associated with the virtual ingress port 140. In one embodiment, the virtual ingress buffer account 142 and the virtual ingress buffer counter 144 may be integrated. In one embodiment, if the data manager 104 determines that all available memory space is being used, the incoming or received data may be ignored, or more colloquially "dropped."

In one embodiment, the apparatus 100 may include a global buffer pool 170. In one embodiment, the global buffer pool 170 may include a global buffer accounting entity 178. In turn, in one embodiment, the global buffer accounting entity 178 may include a global buffer account 172 configured to track or map to data, related to the various ports or buffers and stored within the memory 102, such that the data is arranged in some logical fashion (e.g., a FIFO, a queue, etc.), similar to those buffer accounts described above. It is understood that, in one embodiment, the data may still be physically stored within the memory 102 but allocated to the global buffer pool 170. In one embodiment, the global buffer accounting entity 178 may regulate the amount of memory storage available to the global buffer pool 170.

In one embodiment, should the received data fail an admission check due to the lack of buffer space available to a virtual ingress port 140, an attempt may be made to place the data within a shared global buffer pool (e.g., global buffer pool 170). In one embodiment, the data manager 104 may be configured to attempt to assign the data to the global buffer pool 170 when the addition of data to the virtual ingress buffer account 142 would exceed the threshold size. Similar to the cases stated above, in one embodiment, the data manager 104 may check, verify, or determine whether or not the addition of data to the global buffer pool 170 would exceed a limit or threshold value associated with the global buffer pool 170. In one embodiment, if the data manager 104 determines that all available memory space is being used, the incoming or received data may be ignored, or more colloquially "dropped."

In various embodiments, different schemes may be used to determine how much data and of what data type may be placed within or associated with the global buffer pool 170. In one embodiment, data may be assigned to the pool 170 in a free-for-all fashion. As long as the overall size of the pool 170 does not exceed a threshold, any data may be assigned to the global buffer pool 170. In an alternate embodiment, limits may be placed on how much data of each data type may be assigned to the pool 170. For example, the data type limits may be based upon a total number of bytes, a percentage of the pool, frequency of usage, etc. In various embodiments, limits may be placed upon the amount of data associated with each physical or virtual ingress or egress port that may be assigned to the global buffer pool 170. In some embodiments, the global buffer pool 170 may be used as secondary storage or allocation of memory 102 for both ingress and egress ports. In such an embodiment, a similar check, as described above, may be performed as part of the egress-centric admission check, discussed in more detail below.

In one embodiment, the data manger 104 may be configured to, as part of the egress-centric admission check, check, verify, or determine whether or not the admission of the data would exceed a buffer limit or threshold for the physical egress port 120 from which the data will be transmitted. In various embodiments, the threshold may be dynamically configurable. In one embodiment, the physical egress port 120 may include a physical egress port buffer accounting entity 128. In one embodiment, the physical egress port buffer accounting entity 128 may include a physical egress buffer account 122 and a physical egress buffer counter 124. In various embodiments, these elements may be configured to similarly to their ingress counterparts described above. In one embodiment, if the data manager 104 determines that all available memory space is being used, the incoming or received data may be ignored, or more colloquially "dropped." In one embodiment, in which the received data has multiple destinations (e.g., multi-cast data), this admission check may be performed on multiple egress ports 120. Depending upon the embodiment or configuration of the embodiment, the data may be required to pass the admission check for every associated egress port 120 or alternatively merely one of them.

In one embodiment, the data manger 104 may be configured to, as part of the egress-centric admission check, check, verify or determine whether or not the admission of the data would exceed a buffer limit or threshold for the virtual egress port 150 of the virtual routing device 130 to which the data is assigned. In various embodiments, the threshold may be dynamically configurable. In one embodiment, each virtual routing device 130 may include a plurality of virtual egress ports. In various embodiments, these virtual egress ports may have a one-to-one correspondence with the physical egress ports 120. In other embodiments, some physical egress ports may be restricted to a limited number of data types, and therefore, such a physical egress port may not have counterparts in every virtual routing device.

In one embodiment, the virtual egress port 150 may include a virtual egress port buffer accounting entity 158. In various embodiments, the virtual buffer accounting entity 158 may include a virtual egress buffer account 152 and a virtual ingress buffer counter 154. In various embodiments, these elements may be configured similarly to their ingress counterparts described above. In one embodiment, if the data manager 104 determines that all available memory space is being used, the incoming or received data may be ignored, or more colloquially "dropped." Depending upon the embodiment or configuration of the embodiment, the data may be required to pass the admission check for every associated egress port 150 or alternatively merely one of them.

In one embodiment, the data manger 104 may be configured to, as part of the global-centric admission check, check, verify or determine whether or not the admission of the data would exceed a physical or artificial limit on the amount of data that may be stored within the memory 102. In various embodiments, the amount of physical space used within the memory 102 may be tracked using a total usage counter 108. In various embodiments, the sum of the memory space allocated to the various ingress and egress buffers (or buffer accounting entities) may exceed the total amount of physical memory space provided by memory 104. In such an embodiment, the admission check may be passed while reviewing the various buffers (or buffer accounting entities) but fail when checking against the total memory usage. In one embodiment, if the data manager 104 determines that all available memory space is being used, the incoming or received data may be ignored, or more colloquially "dropped."

In one embodiment, upon the successful completion of the admission check, the data manager 104 may be configured to associate the admitted data with a plurality of buffers (or buffer accounts) and virtual routing devices 130. In various embodiments, examples may include mirroring or multi-cast data; although, it is understood that the above are merely a few illustrative examples to which the disclosed subject matter is not limited. In one embodiment, the data manager 104 may increment a counter that tracks or measures the amount of data associated with the respective buffer. For example, in one embodiment, the data manager 104 may place the data within the memory 102. The data manager 104 may then, in one embodiment, add the location of the data to the physical ingress buffer account 112. The data manager 104 may also, in one embodiment, increment the physical ingress buffer counter 114 to reflect the addition of the data to the physical ingress buffer account 112. For example, if one kilobyte of data were added to the buffer account, the respective counter may be incremented by one kilobyte. In various embodiments, similar the data manager 104 may be configured to provide similar allocations and increments to the respective affected virtual ingress, virtual egress, and physical egress components (e.g., virtual ingress buffer accounting entity 148, virtual egress buffer accounting entity 158, and physical egress buffer accounting entity 128). In one embodiment, the total usage counter 108 may be incremented to reflect the amount of data actually placed within the memory 102, not the total amount allocated to the respective buffers (or buffer accounts).

Conversely, in one embodiment, upon the transmission of the data from the apparatus 100, the data manager 104 may be adapted to remove the data from the buffer accounts to which it belongs (e.g., physical ingress buffer account 112, virtual ingress buffer account 142, virtual egress buffer account 152, and physical egress buffer account 122). The data manager 104 may also be configured to, in one embodiment, decrement the buffer counters appropriately (e.g., physical ingress buffer counter 114, virtual ingress buffer counter 144, virtual egress buffer counter 154, and physical egress buffer counter 124). The data manager 104 may be adapted to remove the data from the memory 102 and decrement the total usage counter 108. In some embodiments, if the data has multiple destinations (e.g., multi-cast data) the data manager 104 may only remove the effects or associations with the data from the buffer accounting entities, the memory 102 and the total usage counter 108 when the data has been transmitted to all of the multiple destinations. In another embodiment, the data manager 104 may be configured to remove the effects or associations with the data from the buffer accounting entities as the data is transmitted from the respective egress ports, but to only remove the data, its effects, and associations from the memory 102 and ingress buffer accounting entities (physical and virtual) when all copies of the data have been transmitted.

In various embodiments, deallocation from the global buffer pool 106 may occur in multiple ways. In some less preferred embodiments, as space becomes available in the virtual buffer (e.g., via virtual ingress buffer accounting entity 148) the data from the global buffer pool 106 may be reassigned to the virtual ingress buffer. In such an embodiment, the data manager 104 may be configured to remove the entry for the data from the global buffer account 172 and add an entry for the data in the proper virtual ingress buffer account 142. The data manager 104 may also be configured to increment or decrement and associated counters appropriately. It is understood that in some embodiments the data in the global buffer pool 106 may be associated with a virtual egress port 150 instead of a virtual ingress port 140. In which case, in some embodiments specifically those including data with multiple destinations, the data (or the association with the data) may be transferred only when sufficient space exists in the buffers of all the egress ports 150 from which the data is to be transmitted. In one embodiment, the data manager 104 may be configured to leave the data (or the association with the data) with the global buffer pool 106 regardless of whether or not space in the virtual buffers has become available. It is understood that the above are merely a few illustrative examples to which the disclosed subject matter is not limited.

Figure 2:
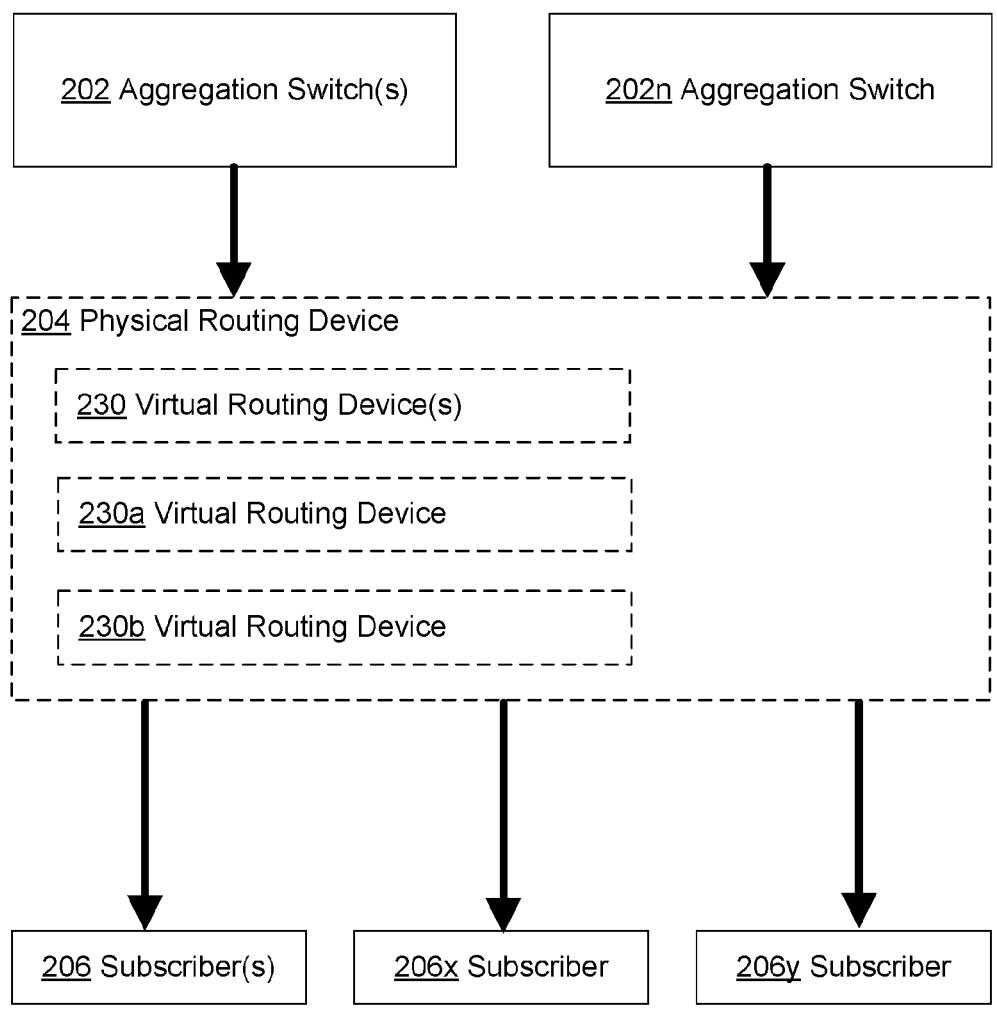
FIG. 2 is a block diagram of an example embodiment of a system for the routing data within a communication system in accordance with the disclosed subject matter.

FIG. 2 is a block diagram of an example embodiment of a system for the routing data within a communication system in accordance with the disclosed subject matter. In one embodiment, the system 200 may include at least one aggregation switch 202 and 202n, and a physical routing device 204. In one embodiment, the physical routing device 204 may include a plurality of virtual routing devices (e.g., VRD 230, 230a, and 230b).

In one embodiment, the aggregation switch 202 may be configured to receive data from a plurality of sources, aggregate the data, and provide the data to the physical routing device 204. As described above, in one embodiment, the data provided to the physical routing device 204 may comprise a plurality of data types. In some embodiments, the data received by the aggregation switch 202 may include a Broadband Remote Access Server (BRAS). In such an embodiment, the aggregation switch 202 may be configured to provide aggregation capabilities between a Regional/Access Network (RAN) and the Network Service Provider (NSP) or Application Service Provider (ASP). As an example, the aggregation switch 202 may receive data from a telephonic NSP, a cable or satellite television NSP, an Internet NSP, an operational support system (OSS), Internet Protocol Multimedia Subsystem (IMS), etc.

In one embodiment, the physical routing device 204 may be configured to route data from the aggregation switch 202 to a plurality of subscribers 206. In various embodiments, the physical routing device 204 may include an apparatus such as apparatus 100 of FIG. 1. In one embodiment, the physical routing device 204 may include an Internet Protocol (IP) Digital Subscriber Line Access Multiplexer (DSLAM). In one embodiment, the physical routing device 204 may include a plurality of virtual routing devices 230. In such an embodiment, the virtual routing device 230 may be configured to be associated with a particular data type. Furthermore, in one embodiment, the virtual routing device 230 may be configured to virtually buffer data associated with the respective data type, and regulate the quality of service provided to the respective data type.

In one embodiment, the system 200 may include a plurality of subscribers 206, 206x, and 206y. In one embodiment, the subscriber 206 may be configured to receive at least one data type. In various embodiments, the subscriber 206 may be configured to receive data from the physical routing device 204. In one embodiment, the subscriber 206 may be an individual residential subscriber, a co-location facility, a business termination point, a head-end control device, etc. Although, it is understood that the above are merely a few illustrative examples to which the disclosed subject matter is not limited.

FIG. 3 is a flowchart of an example embodiment of a technique 300 for the routing data within a communication system in accordance with the disclosed subject matter. It is understood that FIGS. 3a and 3b represent a single flowchart illustrated on two pages. The connector 301 provides a way to represent the connection between the two pages. Hereafter and here-before, the flowchart of the technique 300 is simply referred to as FIG. 3, as if the flowchart merely occupied a single page.

Block 302 illustrates that, in one embodiment, data may be received via a physical ingress port. In various embodiments, the physical ingress port 110 of FIG. 1 may receive the data, as described above. In various embodiments, the physical routing device 204 of FIG. 2 may receive the data or perform any of the actions illustrated by technique 300, as described above.

Block 304 illustrates that, in one embodiment, the data may be inspected to determine which of a plurality of data types is associated with the received data. In one embodiment, the data manager 104 of FIG. 1 may inspect the data or make this determination the data, as described above. In one embodiment, illustrated by Block 306, the plurality of data types may include video data, voice data, or non-real-time data, as described above. Although, it is understood that the above are merely a few illustrative examples to which the disclosed subject matter is not limited.

Block 308 illustrates that, in one embodiment, a determination may be made as to whether or not the data includes multiple destinations (e.g., multi-cast data). In one embodiment, the data manager 104 of FIG. 1 may inspect the data or make this determination the data, as described above.

Block 310 illustrates that, in one embodiment, the received data may be assigned to a virtual routing device associated with the data type of the received data. In one embodiment, the data manager 104 of FIG. 1 may assign the data to a virtual routing device, as described above. In one embodiment, the virtual routing device 130 of FIG. 1 may be assigned the data, as described above.

Block 312 and Block 316 illustrates that, in one embodiment, an attempt may be made to assign the data to a virtual ingress port of the virtual routing device. In one embodiment, a determination may be made as to whether or not the addition of the received data to the virtual ingress port would exceed a limit or threshold of the virtual ingress port buffer. In one embodiment, the data manager 104 of FIG. 1 may make the attempt and determination, as described above. In one embodiment, the virtual ingress port 140 of FIG. 1 may be assigned the data, as described above. In one embodiment, the virtual ingress buffer accounting entity 148 of FIG. 1 may simulate a virtual ingress port, as described above. In one embodiment, the virtual routing device may regulate quality of service provided to a particular data type by altering or adjusting the size of the buffers associated with the data type's virtual routing device, as described above.

Block 314 illustrates that, in one embodiment, if the virtual ingress port has sufficient available buffer space, the data may be assigned to the virtual ingress port. In one embodiment, the data manager 104 of FIG. 1 may make the assignment, as described above. In one embodiment, the virtual ingress buffer accounting entity 148 or the virtual ingress buffer account 142 of FIG. 1 may be altered to receive the assignment, as described above.

Block 318 illustrates that, in one embodiment, if the data may not be assigned to the virtual ingress port due to insufficient available buffer space, an attempt may be made to assign the data to a global buffer pool. In various embodiments, the global buffer pool may utilize a number of schemes to determine whether or not the assignment of data to the pool is acceptable, as described above. In one embodiment, the data manager 104 of FIG. 1 may make the determination, as described above. In one embodiment, the global buffer pool 170 of FIG. 1 may be the object of the determination, as described above.

Block 320 illustrates that, in one embodiment, if the data may be assigned to the global buffer pool, the data may be assigned to the virtual ingress port and the data may also be assigned to the global buffer pool. In one embodiment, this may include the virtual ingress buffer accounting entity tracking the position of the data within a queue or other data structure and indicating that the data s allocated to the global buffer pool, not the virtual ingress buffer. In one embodiment, the data manager 104 of FIG. 1 may make the assignment, as described above. In one embodiment, the virtual ingress buffer accounting entity 148 and the global buffer pool 170 of FIG. 1 may be the object of the assignment, as described above. It is understood that various embodiments may exist that do not include or utilize a global buffer pool.

Block 322 illustrates that, in one embodiment, a determination may be made as to which of at least one virtual egress port buffer of assigned the virtual routing device is associated with a destination of the multi-cast data. In the case in which the data has multiple destinations, it may be associated with a plurality of physical egress ports. In one embodiment, the mapping of those physical egress ports to virtual egress ports within the assigned virtual routing device may occur. In one embodiment, the data manager 104 of FIG. 1 may make the determination, as described above. In one embodiment, the virtual egress port 150 of FIG. 1 may be associated with the data, as described above. In one embodiment, the virtual egress buffer accounting entity 158 of FIG. 1 may simulate a virtual egress port, as described above. It is understood that incases in which the data only has a single destination (e.g., uni-cast data), a determination of the proper egress port (both physical and virtual) for the data may still occur.

Block 324 illustrates that, in one embodiment, an attempt may be made to assign the data to a virtual egress port of the virtual routing device. In one embodiment, a determination may be made as to whether or not the addition of the received data to the virtual egress port would exceed a limit or threshold of the virtual egress port buffer. In one embodiment, the data manager 104 of FIG. 1 may make the attempt and determination, as described above. In one embodiment, the virtual egress port 150 of FIG. 1 may be assigned the data, as described above. In one embodiment, the virtual egress buffer accounting entity 158 of FIG. 1 may simulate a virtual egress port, as described above. In one embodiment, the virtual routing device may regulate quality of service provided to a particular data type by altering or adjusting the size of the buffers associated with the data type's virtual routing device, as described above.

Block 326 illustrates that, in one embodiment, if the virtual egress port has sufficient available buffer space, the data may be assigned to the virtual egress port. In one embodiment, the data manager 104 of FIG. 1 may make the assignment, as described above. In one embodiment, the virtual egress buffer accounting entity 158 or the virtual egress buffer account 152 of FIG. 1 may be altered to receive the assignment, as described above.

Block 330 illustrates that, in one embodiment, the received data may be buffered. Blocks 332, 334, and 336 illustrate a generic embodiment that may be used for both single destination data (e.g., uni-cast data) and multiple destination data (e.g., multi-cast data). Whereas, Blocks 338, 340, and 342 illustrate a more specific embodiment that focuses on the wants of multiple destination data (e.g., multi-cast data). Although, it is understood that the above are merely a few illustrative examples to which the disclosed subject matter is not limited.

Block 332 illustrates that, in one embodiment, the received data may be stored in a memory. Block 338 illustrates that, in some embodiments, the received data may be stored only once within a memory. In some examples, the data may only be stored once but associated with or assigned to a physical ingress port buffer, a virtual ingress port buffer, a plurality of virtual egress port buffers, and a plurality of physical egress port buffers. In various embodiments, this may allow the technique 300 or an apparatus (e.g., apparatus 100 of FIG. 1) the simultaneous benefits of having separate buffers for each port and of having a shared common memory space, although this is merely one example embodiment to which the disclosed subject matter is not limited. In one embodiment, the data manager 104 and the memory 102 of FIG. 1 may buffer the data, as described above.

Block 334 and Block 340 illustrates that, in one embodiment, the data may be associated with an ingress port buffer that tracks the amount of data assigned to the ingress port buffer and where in the memory the data is stored. In one embodiment, action illustrated by Block 334 may be performed for both a physical ingress port and a virtual ingress port. In various embodiments, the ingress port buffer may be simulated by a buffer accounting entity. In one embodiment, the data manager 104 of FIG. 1 may make the association, as described above. In one embodiment, the virtual ingress buffer account 142 or the physical ingress buffer account 112 of FIG. 1 may track the buffer usage and data, as described above. In one embodiment, the virtual ingress buffer accounting entity 148 and/or the physical ingress buffer accounting entity 118 of FIG. 1 may track the buffer usage and data, as described above.

Block 336 illustrates that, in one embodiment, the data may be associated with an egress port buffer that tracks the amount of data assigned to the egress port buffer and where in the memory the data is stored. Block 342 illustrates that this association may occur for a plurality of egress port buffers, wherein each egress port is associated with a destination of the data (e.g., multi-cast data). In one embodiment, action illustrated by Blocks 336 and 342 may be performed for both a physical egress port and a virtual egress port. In various embodiments, the egress port buffer may be simulated by a buffer accounting entity. In one embodiment, the data manager 104 of FIG. 1 may make the association, as described above. In one embodiment, the virtual egress buffer account 152 or the physical egress buffer account 122 of FIG. 1 may track the buffer usage and data, as described above. In one embodiment, the virtual egress buffer accounting entity 158 and/or the physical egress buffer accounting entity 128 of FIG. 1 may track the buffer usage and data, as described above.

Block 344 illustrates that, in one embodiment, the data may be transmitted to another device (e.g., a subscriber 206 of FIG. 2) via a physical egress port. In one embodiment, the physical egress port 120 may transmit the data, as described above.

Block 346 illustrates that, in one embodiment, as or after the data is transmitted by the physical egress port, the data may be de-assigned from the virtual ingress port buffer. In one embodiment, the data manager 104 of FIG. 1 may de-assign the data, as described above. In one embodiment, the data may be removed from the virtual ingress buffer accounting entity 148 of FIG. 1 (or an element thereof), as described above.

Block 348 illustrates that, in one embodiment, as or after the data is transmitted by the physical egress port, the data may be de-assigned from the physical ingress port buffer. In one embodiment, the data manager 104 of FIG. 1 may de-assign the data, as described above. In one embodiment, the data may be removed from the physical ingress buffer accounting entity 118 of FIG. 1 (or an element thereof), as described above.

Block 350 illustrates that, in one embodiment, as or after the data is transmitted by the physical egress port, the data may be de-assigned from the virtual egress port buffer. In one embodiment, the data manager 104 of FIG. 1 may de-assign the data, as described above. In one embodiment, the data may be removed from the virtual egress buffer accounting entity 158 of FIG. 1 (or an element thereof), as described above. In one embodiment, involving data with multiple destinations, the data may only be de-assigned from a virtual egress port that is associated with the transmitting physical egress port.

Block 352 illustrates that, in one embodiment, as or after the data is transmitted by the physical egress port, the data may be de-assigned from the physical egress port buffer. In one embodiment, the data manager 104 of FIG. 1 may de-assign the data, as described above. In one embodiment, the data may be removed from the physical egress buffer accounting entity 128 of FIG. 1 (or an element thereof), as described above. In one embodiment, involving data with multiple destinations, the data may only be de-assigned from the physical egress port that transmitted that data.

Block 354 illustrates that, in one embodiment, as or after the data is transmitted by the physical egress port, the data may be de-assigned from the global buffer pool. In one embodiment, the data manager 104 of FIG. 1 may de-assign the data, as described above. In one embodiment, the data may be removed from the global buffer pool 170 of FIG. 1 (or an element thereof), as described above. In one embodiment, data may be de-assigned from the global buffer pool not just as a result of it being transmitted by the physical egress port, but as a result of space becoming available within the associated organizing buffer, as described above.

Furthermore, in one embodiment, the data may only be removed from a central memory (e.g., memory 102 of FIG. 1) when the data has been de-assigned from all previously assigned buffers (both physical and virtual, and ingress and egress). In one embodiment, the data manager 104 and/or the memory 102 of FIG. 1 may remove the data from memory, as described above.

Embodiments of the various techniques described herein may be implemented in digital electronic circuitry, or in computer hardware, firmware, software, or in combinations of them. Implementations may implemented as a computer program product, e.g. a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus comprising:
a plurality of physical ingress ports configured to receive data, the received data having a plurality of data types, wherein the data type includes a voice data, a video data and non-real time data, the received data being received from multiple sources;
a plurality of virtual routing devices, wherein each of the virtual routing devices is associated with a particular data type and each of the virtual routing devices is configured to:
virtually buffer data associated with the respective data type via one or more virtual ingress buffers, wherein each virtual routing device includes a corresponding virtual ingress buffer for each of the plurality of physical ingress ports, and
regulate the quality of service provided to the respective data type; and
a data manager configured to manage the receipt and transmission of data.

2. The apparatus of claim 1 wherein each virtual routing device comprises:
a buffer accounting entity configured to act as a virtual ingress port configured to receive data of at least one selected data type.

3. The apparatus of claim 1 wherein each physical ingress port is associated with at least one virtual routing device; and
each virtual routing device is configured to receive data of at least one selected data type.

4. The apparatus of claim 1 wherein the data type comprises a data type selected from the group of data types consisting of: voice based data, video based data, and non-real time data.

5. The apparatus of claim 1 further comprising a total usage counter configured to track the total amount of memory used to buffer the data; and
wherein each virtual routing device comprises:
a virtual ingress port configured to receive data of at least one selected data type,
a virtual ingress buffer configured to facilitate the storage of data received by the virtual ingress port, and a virtual ingress buffer counter configured to track the amount of data associated with the virtual ingress buffer.

6. The apparatus of claim 5 where the data manger is configured to, upon the receipt of the data through a physical ingress port:
   assign the data to a virtual routing device of the plurality of virtual routing devices, based at least in part upon the data type of the received data;
   verify that a physical memory comprises sufficient available space to store the received data; and
   verify that the virtual ingress buffer comprises sufficient available space to store the received data.

7. The apparatus of claim 6 wherein the data manger is configured to, upon the receipt of data through the physical ingress port:
   assign the data to an egress port, wherein the egress port includes an egress port buffer configured to facilitate the storage of data received by the egress port, and
   verify that the egress port buffer comprises sufficient available space to store the received data.

8. The apparatus of claim 7 wherein each virtual routing device comprises a virtual egress port configured to represent a physical egress port, wherein the physical egress port is configured to transmit data; and
   wherein the virtual egress port comprises a virtual egress port buffer configured to facilitate the storage of data to be transmitted by the physical egress port.

9. The apparatus of claim 5 further comprising a global buffer pool configured to facilitate the storage of data when at least one of the virtual ingress buffers would otherwise exceed a threshold size; and
   wherein the data manger is configured to assign the data to the global buffer pool when the addition of data to the virtual ingress buffer would exceed the threshold size.

10. A method comprising:
    receiving data via a plurality of physical ingress ports, the received data having a plurality of data types;
    detecting the data type associated with the data, wherein the data type includes a voice data, a video data and non-real time data, the received data being received from multiple sources;
    assigning the data to at least one virtual routing device of a plurality of virtual routing devices, associated with the data type of the data; and
    buffering the data in both a physical ingress buffer of the physical ingress port and a virtual ingress buffer of the assigned virtual routing device, wherein each virtual routing device is associated with a particular data type and includes a corresponding virtual ingress buffer for each of the plurality of physical ingress ports.

11. The method of claim 10 wherein detecting a data type associated with the data comprises detecting that the data type is a data type selected from the group consisting of: voice based data, video based data, and non-real time data.

12. The method of claim 10 wherein assigning the data to a virtual routing device comprises:
    determining whether or not the addition of the data to a virtual ingress port buffer will exceed a threshold of the virtual ingress port buffer, and
    when the threshold would not be exceeded, assigning the data to the virtual ingress port buffer.

13. The method of claim 10 wherein assigning the data to a virtual routing device comprises:
    determining whether or not the addition of the data to a virtual ingress buffer would exceed a threshold of the virtual ingress port buffer,
    when the threshold is exceeded, determining whether or not the addition of the data to a global buffer pool is allowed; and
    when the addition of the data to a global buffer pool is allowed, assigning the data to the virtual ingress port, and assigning the data to the global buffer pool.

14. The method of claim 13 wherein determining whether or not the addition of the data to a global buffer pool is allowed comprises limiting the amount of data associated with a data type that may be assigned to the global buffer pool.

15. The method of claim 10 wherein buffering the data comprises:
    storing the data in a physical memory;
    associating the data with a physical ingress port buffer that tracks an amount of data assigned to a physical ingress port and where in the physical memory the data associated with the physical ingress port buffer is stored; and
    associating the data with a physical egress port buffer that tracks the amount of data assigned to a physical egress port and where in the physical memory the data associated with the physical egress port is stored.

16. The method of claim 10 wherein transmitting the received data comprises:
    deassigning the received data from a virtual ingress port buffer;
    deassigning the received data from a physical ingress port buffer;
    deassigning the received data from a virtual egress port buffer; and
    deassigning the received data from a physical egress port buffer.

17. The method of claim 10 further comprising:
    determining if the received data is a multi-cast data; and
    when the received data is a multi-cast data, then assigning the received data to at least one virtual routing device comprises:
    determining which of at least one virtual egress port buffer of assigned the virtual routing device is associated with a destination of the multi-cast data,
    determining whether or not the addition of the received data to a virtual egress port buffer, associated with the virtual routing device, will exceed a threshold of the virtual egress port buffer, and
    if the addition of the received data to the virtual egress port buffer will not exceed the threshold, then assigning the received data to the virtual egress port buffer, and
    wherein buffering the received data comprises:
    storing the received data only once in a physical memory,
    associating the received data with a virtual ingress port buffer accounting entity that tracks the amount of data assigned to a virtual ingress port buffer and where in the physical memory the data assigned to the virtual ingress port buffer is stored, and
    associating the received data with a virtual egress port buffer accounting entity that tracks the amount of data assigned to the virtual egress port buffer and where in the physical memory the data assigned to the virtual egress port buffer is stored.

18. A system comprising:
    at least one aggregation switch configured to:
    aggregate data from a plurality of external sources, wherein the data comprises a plurality of data types, wherein the data types include types based upon a real-time characteristic of the data, wherein the data type includes a voice data, a video data and non-real time data;

provide at least a portion of the aggregated data to a physical routing device;

the physical routing device configured to route data from the aggregation switch to a plurality of subscribers; and wherein the physical routing device comprises a plurality of virtual routing devices, wherein each of the virtual routing devices is associated with a particular data type and each of the virtual routing devices is configured to:

virtually buffer data associated with the respective data type via one or more virtual ingress buffers, wherein each virtual routing device includes a corresponding virtual ingress buffer for each of a plurality of physical ingress ports.

19. The system of claim 18 wherein the virtual routing device is further configured to:

virtually buffer data associated with the respective data type, and regulate the quality of service provided to the respective data type; and wherein the virtual routing device comprises a buffer accounting entity configured to:

act as a virtual ingress port, wherein the virtual ingress port is configured to receive data of at least one selected data type, act as a virtual ingress buffer for the data received by the virtual ingress port, wherein the virtual ingress buffer is configured to provide a logical structure to the data received by the virtual ingress port; and wherein the physical routing device is configured to dynamically alter the size of the virtual ingress buffers provided by the plurality of virtual routing devices.

20. The system of claim 18 wherein the physical routing device comprises:

a data manager configured to manage the receipt and transmission of data, a memory configured to store a received data, and wherein each virtual routing device comprises:

a virtual ingress port configured to receive data of at least one selected data type, a virtual ingress buffer configured to facilitate the storage of data received by the virtual ingress port, a virtual ingress buffer counter configured to track the amount of data associated with the ingress buffer; and where the data manger is configured to, upon the receipt of received data:

assign the received data to a virtual routing device, based at least in part the data type of the received data, verify that the memory comprises sufficient available space to store the received data, and verify that the virtual ingress buffer comprises sufficient available space to store the received data.

* * * * *